US012603967B2

(12) United States Patent
    Nakai

(10) Patent No.: US 12,603,967 B2
(45) Date of Patent: Apr. 14, 2026

(54) INFORMATION PROCESSING DEVICE, INFORMATION PROCESSING METHOD, AND PROGRAM

(71) Applicant: Sony Group Corporation, Tokyo (JP)

(72) Inventor: Yuki Nakai, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 44 days.

(21) Appl. No.: 18/577,589

(22) PCT Filed: Mar. 25, 2022

(86) PCT No.: PCT/JP2022/014464
    § 371 (c)(1),
    (2) Date: Jan. 8, 2024

(87) PCT Pub. No.: WO2023/286383
    PCT Pub. Date: Jan. 19, 2023

(65) Prior Publication Data
    US 2024/0179266 A1      May 30, 2024

(30) Foreign Application Priority Data
    Jul. 15, 2021 (JP) ................................. 2021-117215

(51) Int. Cl.
    *H04N 21/2187* (2011.01)
    *H04N 5/262* (2006.01)
    *H04N 21/218* (2011.01)
    *H04N 21/414* (2011.01)

(52) U.S. Cl.
    CPC ..... *H04N 5/2624* (2013.01); *H04N 21/21805* (2013.01); *H04N 21/2187* (2013.01); *H04N 21/41407* (2013.01); *H04N 21/41415* (2013.01)

(58) Field of Classification Search
    CPC ........... H04N 5/2624; H04N 21/21805; H04N 21/2187; H04N 21/41407; H04N 21/41415; H04N 21/23424; H04N 21/8146; H04N 21/4223; H04N 5/265; H04N 21/25891; H04N 21/2665; G06Q 50/10
    See application file for complete search history.

(56) References Cited

U.S. PATENT DOCUMENTS

| | | | | |
|---|---|---|---|---|
| 2009/0013263 | A1* | 1/2009 | Fortnow | ................ G06Q 10/10 |
| | | | | 715/753 |
| 2012/0077172 | A1 | 3/2012 | Watanabe | |
| 2015/0301694 | A1 | 10/2015 | Gottlieb | |
| 2016/0366203 | A1* | 12/2016 | Blong | ................... H04L 65/612 |
| 2017/0094222 | A1 | 3/2017 | Tangeland | |
| 2020/0351321 | A1* | 11/2020 | Lueth | .................... H04L 65/764 |
| 2020/0404344 | A1 | 12/2020 | Bathory | |
| 2022/0284648 | A1* | 9/2022 | Guha Thakurta | ...... G06Q 50/01 |

FOREIGN PATENT DOCUMENTS

| | | |
|---|---|---|
| JP | 2002-344928 A | 11/2002 |
| KR | 10-2007-0044141 A | 4/2007 |
| WO | WO-2011013605 A1 | 2/2011 |

* cited by examiner

*Primary Examiner* — Alazar Tilahun
(74) *Attorney, Agent, or Firm* — Paratus Law Group, PLLC

(57) ABSTRACT

An information processing device according to the present technology includes an association processing unit that associates a partial image section being a partial section of an imaged moving image content obtained by imaging an event with a user-related image being an image related to a user.

19 Claims, 14 Drawing Sheets

CAPTURED IMAGE OF USER A

A

4

CAPTURED IMAGE OF USER B

B

4

CAPTURED IMAGE OF USER C

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2022/014464 (filed on Mar. 25, 2022) under 35 U.S.C. § 371, which claims priority to Japanese Patent Application No. 2021-117215 (filed on Jul. 15, 2021), which are all hereby incorporated by reference in their entirety.

TECHNICAL FIELD

The present technology relates to an information processing device, a method thereof, and a program, and especially relates to a processing technology of imaged moving image content obtained by imaging an event.

BACKGROUND ART

Various technologies have been proposed as processing technologies of imaged moving image content obtained by imaging an event. For example, Patent Document 1 mentioned below discloses a technology of changing a display state of a broadcast content in accordance with a reaction of a user as a viewer with respect to the broadcast content obtained by imaging an event. Specifically, Patent Document 1 discloses a technology of changing a display state of broadcast information broadcast from a broadcast station to a viewer terminal according to a result of aggregation of individual information transmitted from each of a plurality of viewer terminals to the broadcast station.

CITATION LIST

Patent Document

Patent Document 1: JP 2002-344928 A

SUMMARY OF THE INVENTION

Problems to be Solved by the Invention

Here, for an event in which user participation is generally assumed such as a music live event, for example, it is requested to enhance a solid sense of participation in the event in order to improve a satisfaction level of the user.

The present technology has been achieved in view of the circumstances described above, and an object thereof is to improve the solid sense of participation in the event of the user.

Solutions to Problems

An information processing device according to the present technology includes an association processing unit that associates a partial image section being a partial section of an imaged moving image content obtained by imaging an event with a user-related image being an image related to a user.

The event herein mainly is an event in which user participation is generally assumed such as a music live event, for example. The user participation herein mentioned is a concept including not only actual participation in an event with spectators but also virtual participation (for example, a user image is displayed in an event venue as if the user is participating) in an event without spectators and the like, for example. Furthermore, it is conceivable that the user-related image herein is an image obtained by imaging a user who actually participates in the event, an image obtained by imaging a display image in the event venue of a user who virtually participates and the like.

By associating the partial image section of the imaged moving image content with the user-related image as described above, it becomes possible to provide, as the distribution image content for the user, the content obtained by inserting the user-related image being the image obtained by imaging the user who actually participates or virtually participates as described above and the like into the partial image section being the imaging section of the user in the imaged moving image content of the event and the like.

Furthermore, an information processing method according to the present technology is an information processing method of associating a partial image section being a partial section of an imaged moving image content obtained by imaging an event with a user-related image being an image related to a user performed by the information processing device.

Furthermore, the program according to the present technology is a program readable by the computer device and allows the computer device to implement a function of associating a partial image section being a partial section of an imaged moving image content obtained by imaging an event with a user-related image being an image related to a user.

With these information processing method and program, it is possible to implement the information processing device according to the present technology described above.

BRIEF DESCRIPTION OF DRAWINGS

FIG. 1 is a diagram illustrating a configuration example of an image processing system including an information processing device as a first embodiment according to the present technology.

FIG. 5 is an explanatory diagram of functions of the information processing device as a first embodiment.

FIG. 13 is an explanatory diagram of functions of the information processing device as the second embodiment.

MODE FOR CARRYING OUT THE INVENTION

Figure 2:
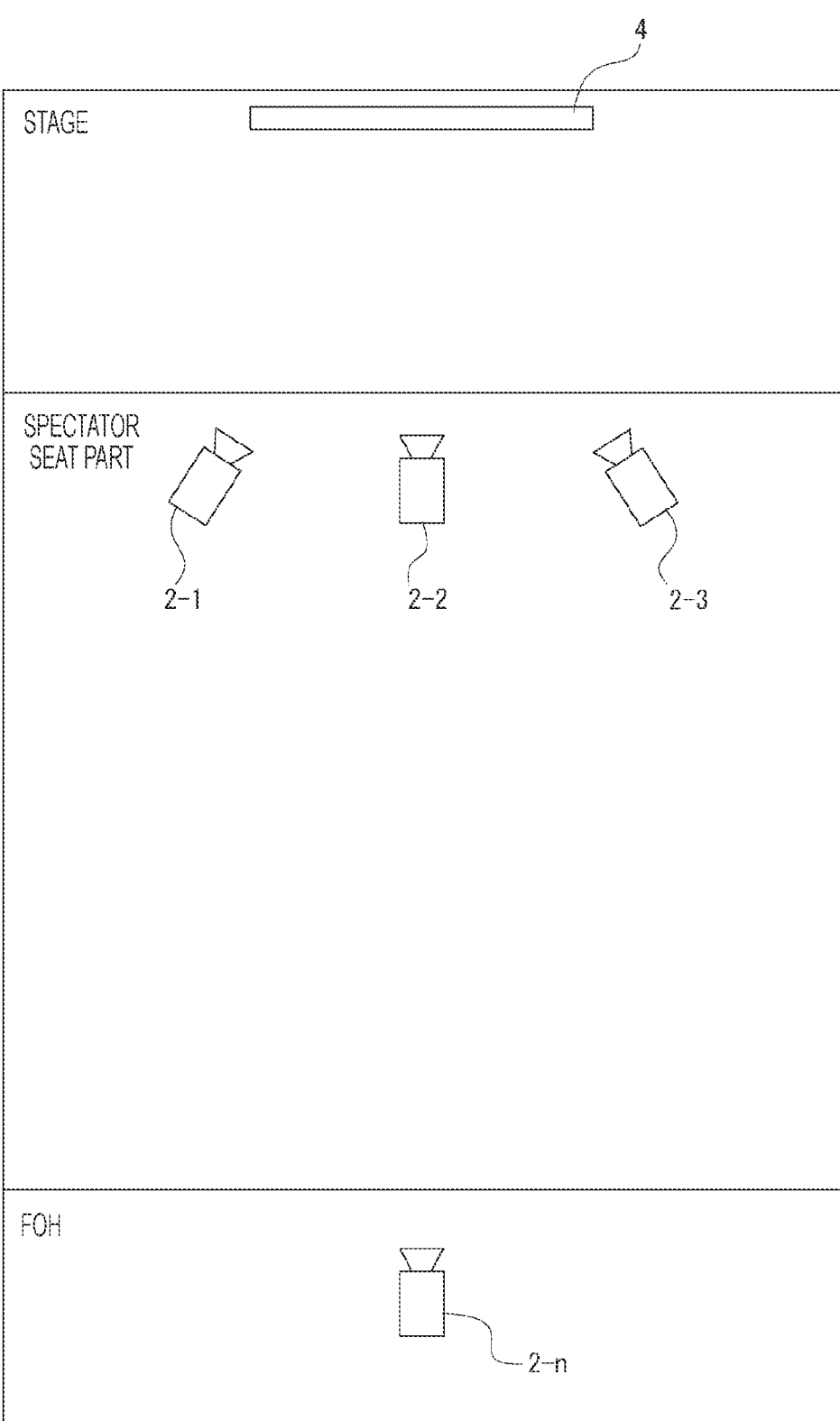
FIG. 2 is an explanatory diagram of an arrangement example of each camera and a display device in an event venue.

Hereinafter, embodiments according to the present technology will be described in the following order with reference to the accompanying drawings.

<1. First Embodiment>
(1-1. Image Processing System as First Embodiment)
(1-2. Hardware Configuration of Computer Device)
(1-3. Image Processing Method as First Embodiment)
(1-4. Processing Procedure)
(1-5. Variation of First Embodiment)
<2. Second Embodiment>
<3. Variation>
<4. Program>
<5. Summary of Embodiments>
<6. Present Technology>

1. First Embodiment (1-1. Image Processing System as First Embodiment)

Figure 1:
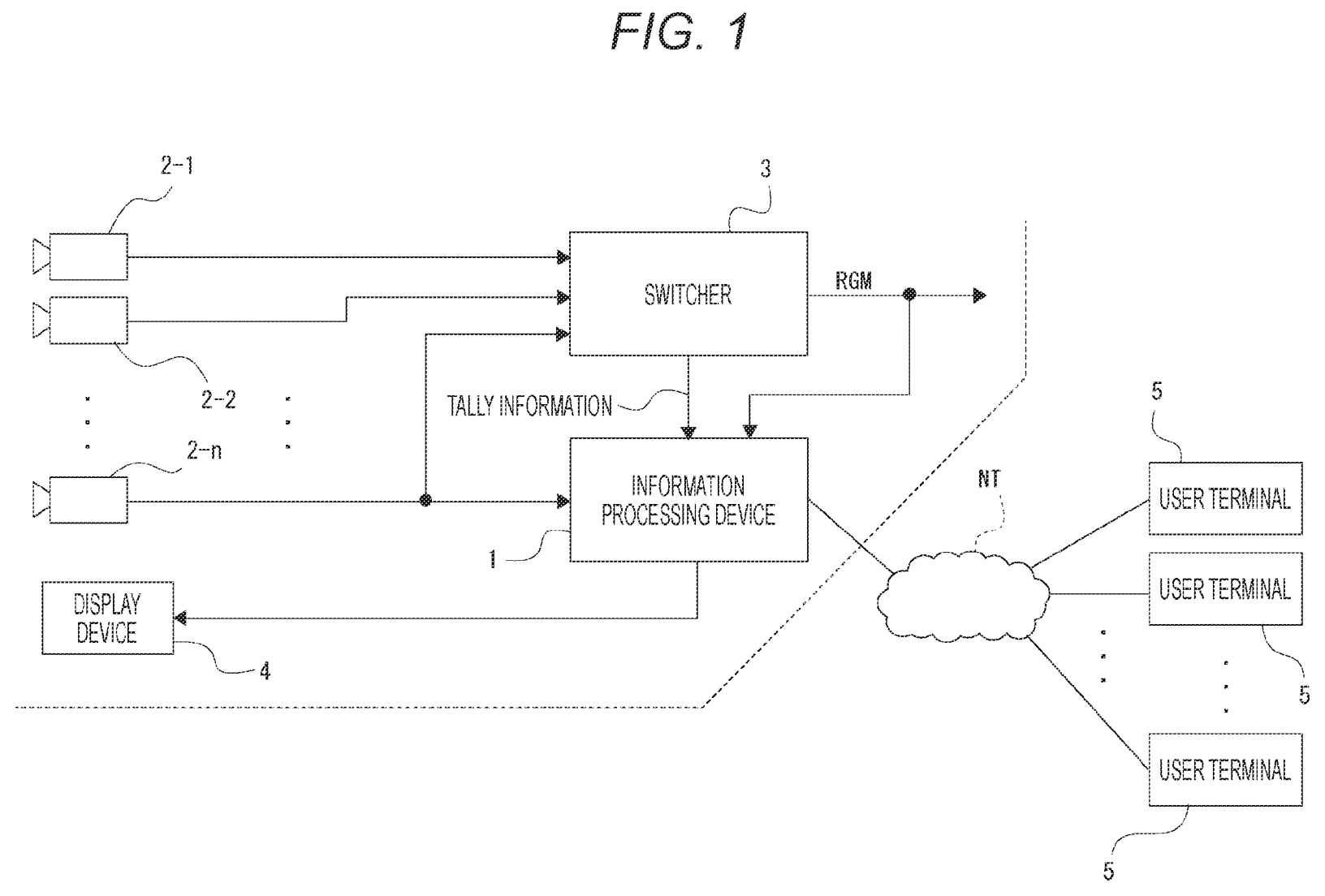

FIG. 1 illustrates a configuration example of an image processing system including an information processing device 1 as a first embodiment according to the present technology.

As illustrated in the drawing, the image processing system includes the information processing device 1, a plurality of cameras 2, a switcher 3, a display device 4, and a plurality of user terminals 5. The information processing device 1 and the user terminal 5 are configured as a computer device including a central processing unit (CPU), for example. In this case, as the user terminal 5, for example, a device mode such as a smartphone, a tablet terminal, and a personal computer is conceivable.

Here, the image processing system of the present embodiment is configured to be able to generate an imaged moving image content by imaging an event by the camera 2 and distribute a moving image content based on the imaged moving image content to the user terminal 5 via a network NT.

Here, the network NT is a communication network such as the Internet and a local area network (LAN), for example.

In the image processing system in this case, the information processing device 1, each camera 2, the switcher 3, and the display device 4 are arranged in an event venue as a venue of an event. In contrast, each user terminal 5 is assumed to be arranged at a place different from the event venue such as a user's home, for example.

An event to be imaged by the image processing system of the present embodiment is an event in which user participation is generally assumed such as a music live event, for example. The user participation herein mentioned is, for example, a concept including not only actual participation in an event with spectators but also virtual participation in an event without spectators and the like. In the present embodiment, the virtual participation means that a user image is displayed in the event venue as if the user participates.

Note that, the user image herein mentioned means an image indicating the user such as an image obtained by imaging the user, for example; the user image will be described later in detail.

The first embodiment is an embodiment on the premise that a participation mode of the user in the event is the virtual participation described above.

Each camera 2 is formed as an imaging device that images including an imaging element such as a charge coupled device (CCD) image sensor and a complementary metal oxide semiconductor (CMOS) image sensor, for example.

In a case of distinguishing a plurality of cameras 2, "-(hyphen)" and a numerical value are added to the end of a reference sign as illustrated in the drawing, and the reference signs are denoted as "2-1", "2-2", . . . , and "2-$n$".

Here, the number of arrangement n of the cameras 2 is optional. In the drawing, an example in which the number of arrangement n of the cameras 2 is at least three or more is illustrated, but this is merely for convenience of illustration, and the number of arrangement n of the cameras 2 is not limited thereto.

In the image processing system, the event venue is imaged from a plurality of viewpoints by the plurality of cameras 2, and the imaged image of each camera 2 is input to the switcher 3.

The switcher 3 selects and outputs images of one system on the basis of an operation from the input images of a plurality of systems. Hereinafter, the image selected and output by the switcher 3 is referred to as a program (PGM) image.

In this example, the PGM image output from the switcher 3 corresponds to the imaged moving image content obtained by imaging the event.

As illustrated in the drawing, the imaged moving image content as the PGM image is input to the information processing device 1.

Furthermore, the switcher 3 outputs tally information to the information processing device 1.

The tally information is information indicating the camera 2 selected by the switcher 3 as the PGM image.

The imaged moving image content as the output image of the switcher 3 can be distributed via a network such as the Internet or can be transmitted by a broadcast wave, for example. Alternatively, the imaged moving image content can also be recorded in a predetermined recording medium.

The display device 4 is a display device that displays the user image for implementing the virtual participation of the user in the event. As the display device 4, for example, a display device such as a light emitting diode (LED) display, a liquid crystal display (LCD), and an organic electroluminescence (EL) display may be adopted. Alternatively, as the display device 4, it is also possible to adopt a projector device that projects an image on a predetermined projection target such as a screen.

The display device 4 displays information such as an image under the control of the information processing device 1.

As will be described later, the user image displayed on the display device 4 for implementing the virtual participation in the present embodiment is an image obtained by imaging the user. In this example, the image obtained by imaging the user is obtained by imaging by the camera provided in the user terminal 5, and the user image obtained by imaging by the user terminal 5 in this manner is transmitted to the information processing device 1 via the network NT.

The information processing device 1 allows the display device 4 to display the user image received from the user terminal 5.

An arrangement example of each camera 2 and the display device 4 in the event venue will be described with reference to FIG. 2.

Here, in the following description, the event to be imaged in the image processing system of the embodiment is assumed to be a music live event.

FIG. 2 illustrates the arrangement example of each camera 2 and the display device 4 corresponding to a case where the target event is the music live event.

As illustrated in the drawing, in the event venue (live venue) in this case, a stage, a spectator seat part, and a front of house (FOH) are provided. On the stage, performers such as players and singers perform.

The spectator seat part is located behind the stage and is a space capable of accommodating spectators.

The FOH is a space located behind the spectator seat part in which elements related to live performance such as lighting and various devices for controlling a sound of the venue are arranged. In the FOH, a person on a live organizer side such as a director or a staff can enter.

As illustrated in the drawing, the display device 4 is arranged on the stage in this example. Specifically, the display device 4 in this case is arranged at a front end (an end on a farther side from the spectator seat part) on the stage in such a manner that a display surface faces the spectator seat part side.

Figure 3:
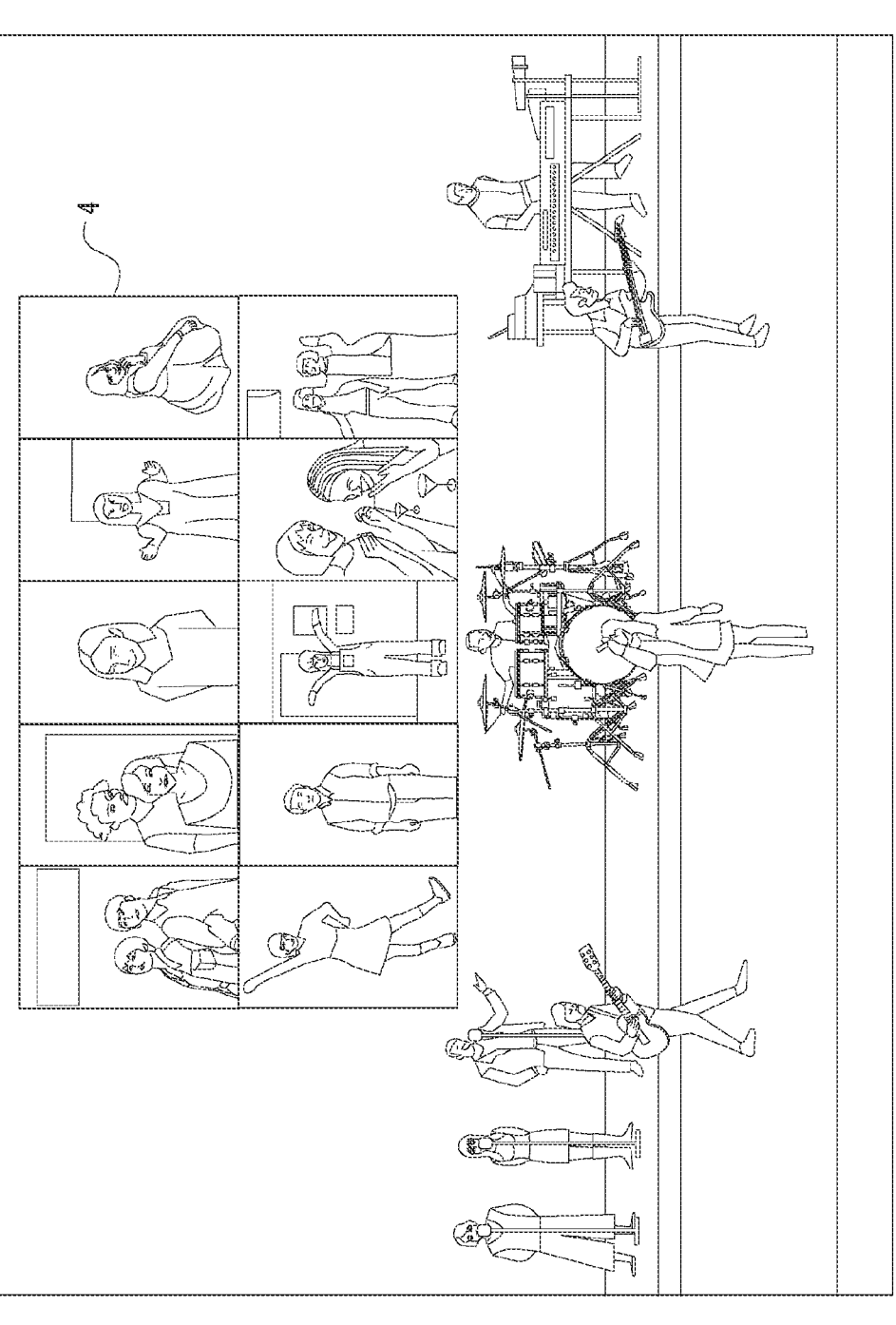
FIG. 3 is an explanatory diagram of a tiling image in the embodiment.

With such an arrangement, as illustrated in FIG. 3, when the stage is viewed from the spectator seat part side, the user image is displayed at a position behind the performer.

Here, as illustrated in FIG. 3, in this example, an arranged image in which the user images of a plurality of users are arranged side by side is displayed on the display device 4. Specifically, as illustrated in the drawing, a tiling image in which the user images of a plurality of users are arranged in a tile shape is displayed.

Note that, in a case of a live show without spectators and the like, the display device 4 can also be arranged in the spectator seat part. Therefore, for the user who virtually participates, a positional relationship between the user and the performer is a positional relationship similar to that in a case of actual participation, which is desirable.

In FIG. 2, as for the arrangement of the cameras 2, three (cameras 2-1, 2-2, and 2-3 in the drawing) of the cameras 2 are arranged in a space (a so-called front fence front space) between the stage and the spectator seat part as illustrated in the drawing. Therefore, the performer on the stage can be captured within an angle of view at a position closer than the FOH. As illustrated in the drawing, the three cameras 2 are arranged at the central portion in a right-to-left direction (direction orthogonal to a front-rear direction), and both right and left ends, respectively.

Furthermore, another camera 2 (referred to as a camera 2-*n* as illustrated in the drawing) out of the cameras 2 is arranged at a position different from that of the three cameras 2-1, 2-2, and 2-3 described above. In this example, the camera 2-*n* is a camera for imaging the user image displayed on the display device 4.

In this example, the camera 2-*n* is arranged in the FOH. However, this is merely an example, and the camera 2-*n* can also be arranged in the spectator seat part.

6

(1-2. Hardware Configuration of Computer Device)

The information processing device 1 and the user terminal 5 illustrated in FIG. 1 can be configured as a computer device 70 having a hardware configuration as described below.

Figure 4:
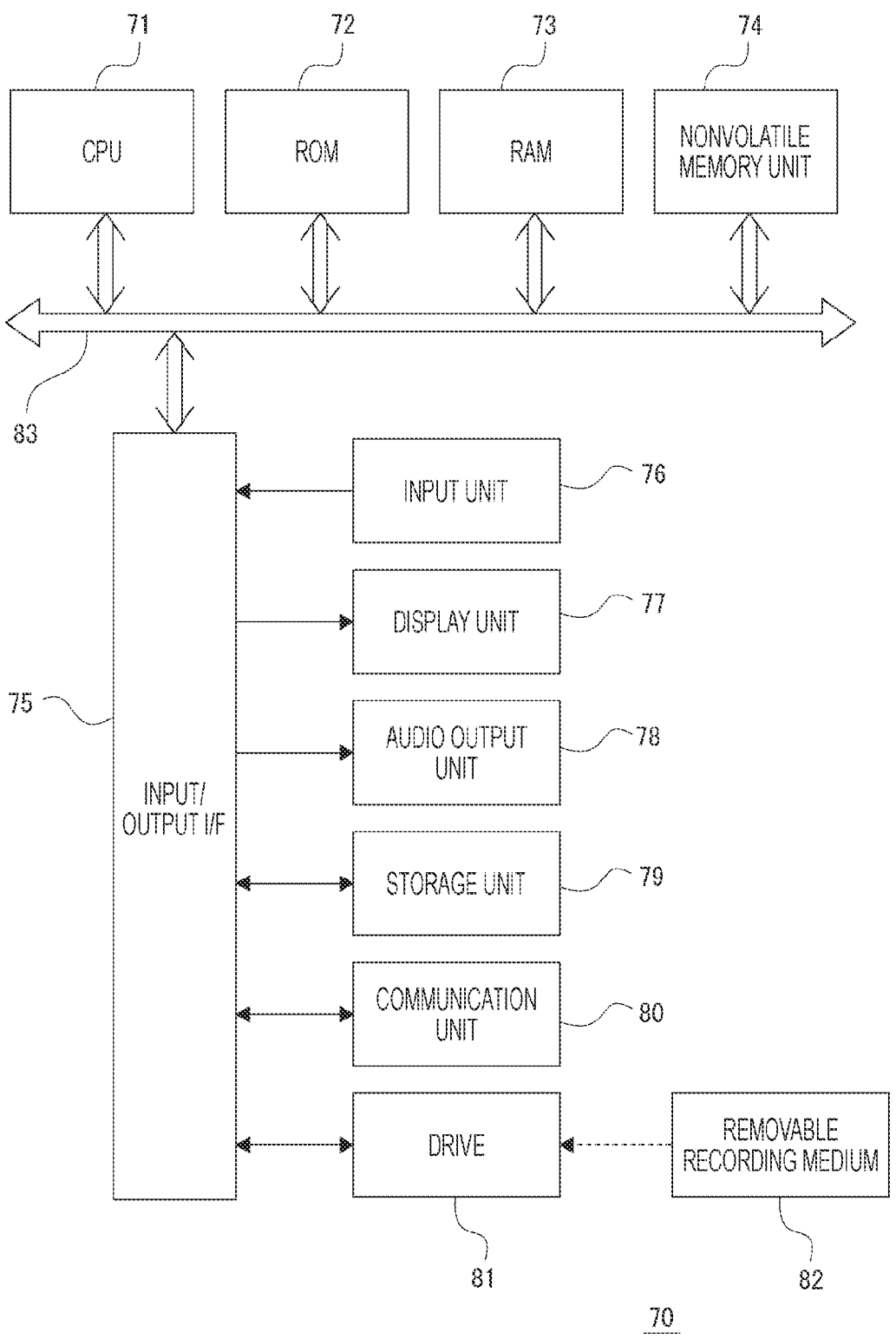
FIG. 4 is a block diagram illustrating a hardware configuration example of a computer device as the embodiment.

FIG. 4 is a block diagram illustrating a hardware configuration example of the computer device 70.

In FIG. 4, a CPU 71 of the computer device 70 executes various types of processing in accordance with a program stored in a nonvolatile memory unit 74 such as a read only memory (ROM) 72 or an electrically erasable programmable read-only memory (EEP-ROM), or a program loaded from a storage unit 79 to a random access memory (RAM) 73. The RAM 73 also appropriately stores data and the like necessary for the CPU 71 to execute the various types of processing.

The CPU 71, the ROM 72, the RAM 73, and the nonvolatile memory unit 74 are connected to each other via a bus 83. An input/output interface 75 is also connected to the bus 83.

An input unit 76 is connected to the input/output interface 75. The input unit 76 comprehensively represents devices that obtain various types of input information such as an operator, an operation device, and a sensor device, for example.

For example, as a configuration for obtaining operation input information in the input unit 76, various types of operators and operation devices such as a keyboard, a mouse, a key, a dial, a touch panel, a touch pad, and a remote controller are assumed. The operation input information obtained by the input unit 76 is interpreted by the CPU 71.

Here, examples of the sensor device included in the input unit 76 may include a camera, for example. Especially, in a case where the computer device 70 is used as the user terminal 5 and the image obtained by imaging the user is used as the user image, the camera is provided as the sensor device in the input unit 76.

Furthermore, a display unit 77 including an LCD, an organic electro-luminescence (EL) display or the like, and an audio output unit 78 including a speaker and the like are integrally or separately connected to the input/output interface 75.

The display unit 77 is a display unit that performs various displays, and includes, for example, a display device provided in a housing of the computer device 70, a separate display device connected to the computer device 70 and the like.

The display unit 77 executes display of an image for various types of image processing, a moving image to be processed and the like on a display screen on the basis of an instruction of the CPU 71. Furthermore, the display unit 77 displays various types of operation menus, icons, messages and the like, that is, displays as a graphical user interface (GUI) on the basis of an instruction of the CPU 71.

There is a case where the storage unit 79 including a hard disk, a solid-state memory and the like, and a communication unit 80 including a modem and the like is connected to the input/output interface 75.

The communication unit 80 executes communication processing via a transmission path such as the Internet or performs wired/wireless communication with various types of devices, and communication using bus communication and the like.

A drive 81 is also connected to the input/output interface 75 as necessary, and a removable recording medium 82 such as a magnetic disk, an optical disk, a magneto-optical disk, and a semiconductor memory is appropriately mounted.

The drive 81 can read a data file such as an image file, various computer programs and the like from the removable recording medium 82. The read data file is stored in the storage unit 79, and an image and audio included in the data file are output by the display unit 77 and the audio output unit 78. Furthermore, the computer program and the like read from the removable recording medium 82 are installed in the storage unit 79, as necessary.

In such computer device 70, software can be installed via network communication by the communication unit 80 or via the removable recording medium 82. Alternatively, the software may be stored in advance in the ROM 72, the storage unit 79 and the like.

Here, in a case where the computer device 70 is used as the information processing device 1, for example, the display device 4 illustrated in FIG. 1 is connected to the input/output interface 75, and the CPU 71 can control a display operation of the display device 4 via the input/output interface 75.

(1-3. Image Processing Method as First Embodiment)

Figure 5:
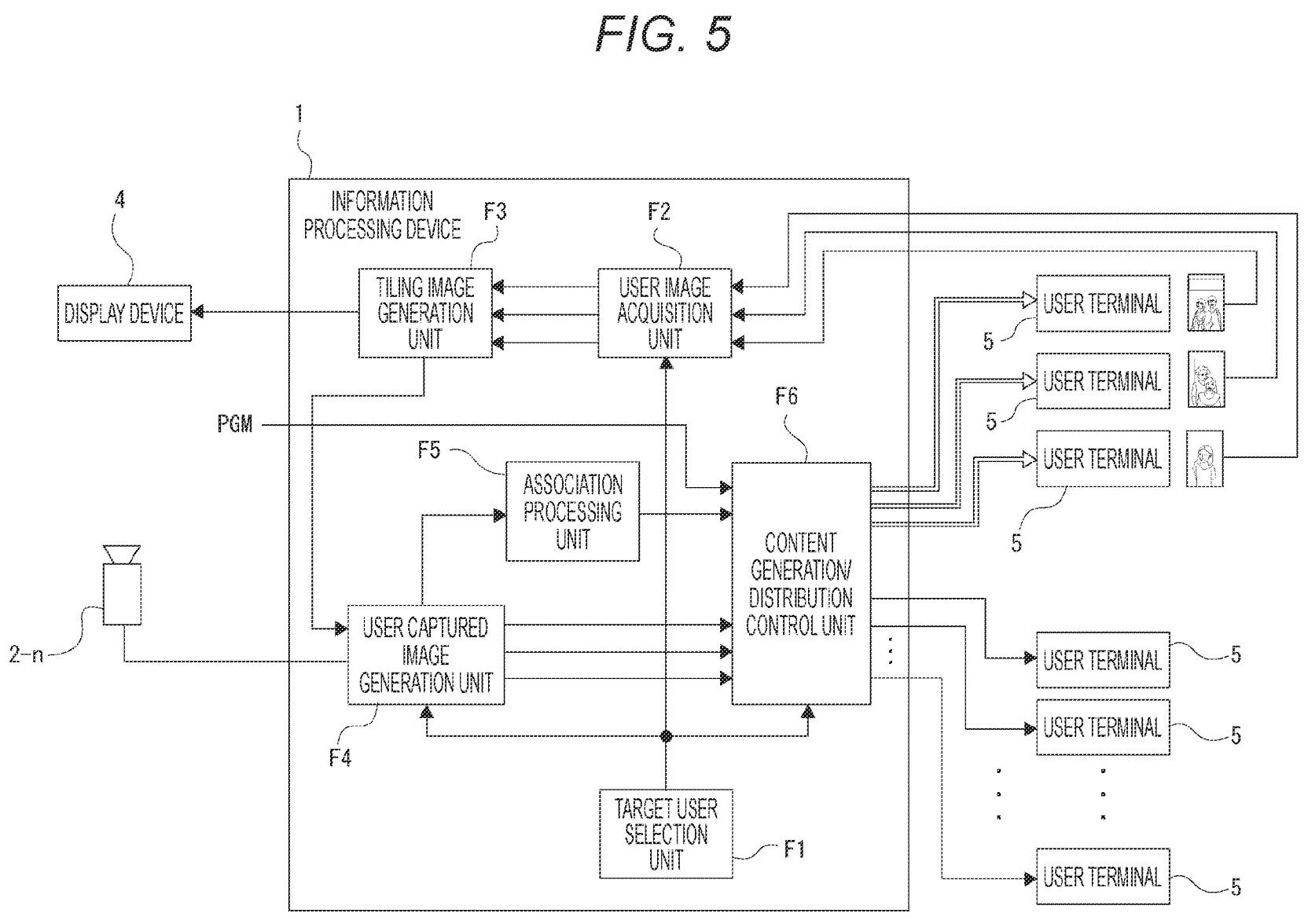

FIG. 5 is an explanatory diagram of functions of the information processing device 1, and illustrates the camera 2-*n*, the display device 4, and the plurality of user terminals 5 together with functional blocks of various functions related to the image processing method as the first embodiment of the information processing device 1.

In this example, the functions by the various functional blocks denoted by reference sign F in the drawing are implemented by software processing of the CPU 71 in the computer device 70 as the information processing device 1.

As illustrated in the drawing, the information processing device 1 has functions as a target user selection unit F1, a user image acquisition unit F2, a tiling image generation unit F3, a user captured image generation unit F4, an association processing unit F5, and a content generation/distribution control unit F6.

The target user selection unit F1 selects a user whose user image is displayed on the display device 4 out of users who virtually participate in the event, specifically, in this example, users who have purchased a participation ticket for virtual participation in the event.

Here, in this example, the user image is displayed on the display device 4 for all the virtually participating users (that is, all the users whose user images are determined to be displayed on the display device 4) within a period from the start to the end of the event.

For this purpose, the target user selection unit F1 determines the number of tiling images to be generated, and a display period of each tiling image, and allocates the users whose user images are displayed in each tiling image on the basis of information of a time length from the start to the end of the event, information of the total number of virtually participating users to the event, and information of the number of user images that can be displayed at one time in the tiling image described above (in other words, information on the number of region divisions in the tiling image) so that a condition that the user image display on the display device 4 is performed for all the virtually participating users is satisfied.

Hereinafter, the user whose user image is displayed in the tiling image is referred to as a "display target user".

In response to a state in which a new tiling image should be displayed, the target user selection unit F1 selects the display target user for the new tiling image according to the allocation for each tiling image described above.

The target user selection unit F1 outputs information indicating the display target user selected in this manner to the user image acquisition unit F2, the user captured image generation unit F4, and the content generation/distribution control unit F6.

The user image acquisition unit F2 performs processing of acquiring the user image from each of the user terminals 5 of the display target users.

FIG. 5 illustrates a state in which the user image is acquired from the user terminal 5 of each display target user in a case where the number of selected display target users (that is, the number of region divisions in the tiling image) is three; however, this is merely an example for description, and the number of display target users selected at one time is not limited to three.

Here, in this example, an imaged image obtained by imaging the user by the user terminal 5 is used as the user image displayed on the display device 4.

Here, as the user image, an imaged image being imaged by the user terminal 5 is used. Therefore, it becomes possible to reflect a state of the display target user in substantially real time on the display device 4 in the event venue.

The user image acquisition unit F2 outputs each user image acquired from the user terminal 5 of the display target user to the tiling image generation unit F3.

The tiling image generation unit F3 generates the tiling image in which the user images input from the user image acquisition unit F2 are arranged in a tile shape, and allows the display device 4 to display the generated tiling image.

The user captured image generation unit F4 inputs the imaged image of the camera 2-*n*, that is, the imaged image in which the display image of the display device 4 is captured within the angle of view, and generates the user captured image for each display target user.

Figure 6:
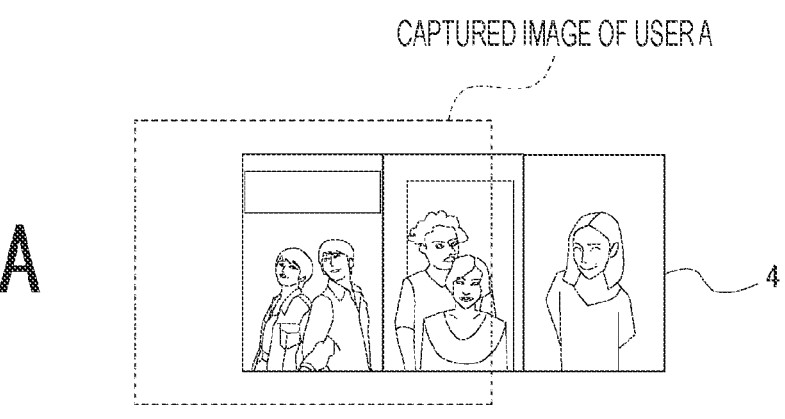
FIG. 6 is an explanatory diagram of a user captured image in the first embodiment.
Figure 6:
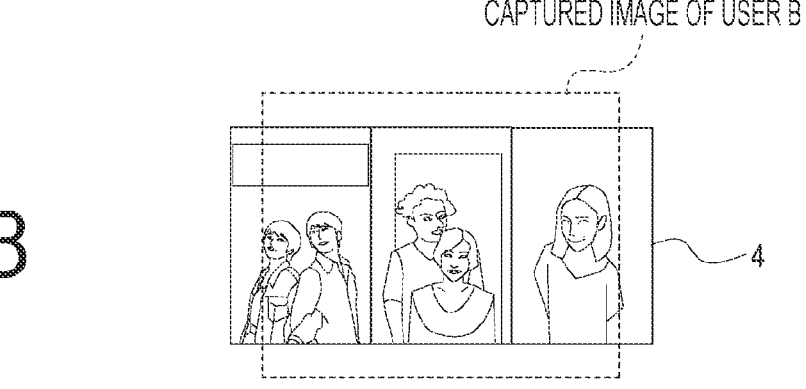
Figure 6:
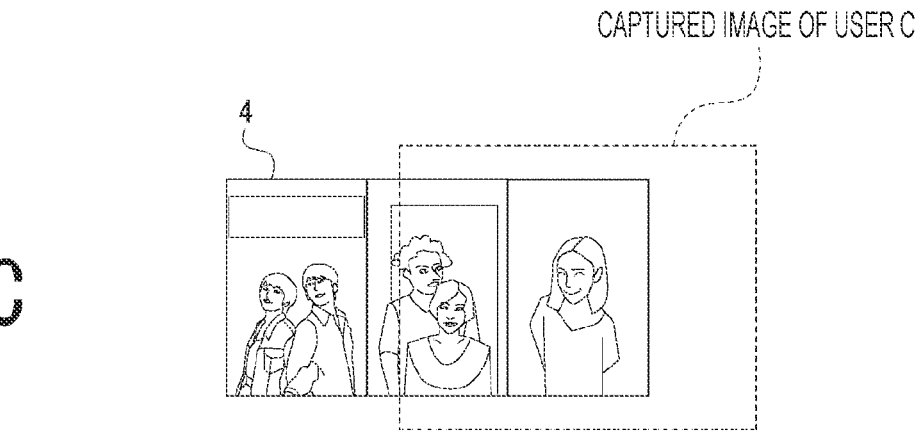

FIG. 6 is an explanatory diagram of the user captured image.

Here, an example of the user captured image generated in a case where the display target users are three users A, B, and C, and the tiling image of these three users is displayed on the display device 4 will be described. In this case, the tiling image has regions divided into three in a lateral direction in which the leftmost region is the display region of the user image of the user A, the central region is the display region of the user image of the user B, and the rightmost region is the display region of the user image of the user C.

FIGS. 6A, 6B, and 6C illustrate examples of generating the user captured images of the user A, user B, and user C, respectively. For example, as illustrated in the drawing, it is conceivable to generate the user captured image in such a manner that the user image of the target user is located at the central portion in the image frame.

Specifically, regarding the imaged image of the camera 2-*n* imaging the display device 4 on which the tiling image is displayed, as for the user A, an image cut out in such a manner that the user image in the leftmost region in the tiling image is located at the central portion in the image frame is set as the user captured image.

Furthermore, as for the users B and C, images cut out in such a manner that the user image in the central region and the user image in the rightmost region in the tiling image are located at the central portion in the image frame are set as the user captured images.

Note that, regarding the user captured image, positioning the user image of the target user at the central portion in the image frame is merely an example.

Furthermore, here, an example is described in which the user captured image is generated by image cutout, but the user captured image can also be obtained by adjusting composition by panning, tilting, and zooming of the Camera 2.

In FIG. 5, information indicating in which region of the tiling image the user image of which user is arranged is input from the tiling image generation unit F3 to the user captured image generation unit F4. On the basis of this information, the user captured image generation unit F4 can generate the user captured image of each display target user as exemplified above.

In this example, the user captured image generation unit F4 generates the user captured image for each display target user as described above by time division within the display period of the tiling image. Specifically, in the display period of the tiling image, the user captured image of the user A is generated over a predetermined period, then the user captured image of the user B is generated over a predetermined period, and then the user captured image of the user C is generated over a predetermined period.

The user captured image generation unit F4 outputs, to the association processing unit F5, information indicating a period in which each image is generated for each user captured image sequentially generated within the display period of the tiling image in this manner as information of a "captured image generation period".

Furthermore, the user captured image generation unit F4 outputs an image ID of the generated user captured image to the association processing unit F5 together with the information of the captured image generation period described above.

The association processing unit F5 associates a partial image section being a partial section of the imaged moving image content (PGM image in this example) with a user-related image being an image related to the user.

Here, the user-related image corresponds to the user captured image generated by the user captured image generation unit F4 in this example.

The association processing unit F5 in this example specifies an image section corresponding to each captured image generation period in the PGM image (imaged moving image content) from the information of the captured image generation period for each user captured image of each display target user input from the user captured image generation unit F4. The image section corresponding to the generation period of the user captured image in the PGM image in this manner is hereinafter referred to as a "captured image generation corresponding section".

The association processing unit F5 performs processing of associating the image ID of each user captured image input from the user captured image generation unit F4 with information of the captured image generation corresponding section for each user captured image specified as described above.

Note that, the captured image generation corresponding section corresponds to an example of the "partial image section" according to the present technology.

The content generation/distribution control unit F6 generates the moving image content obtained by inserting the image based on the user captured image into the captured image generation corresponding section in the PGM image on the basis of association information between the captured image generation corresponding section (an example of the partial image section) and the user captured image (an example of the user-related image) by the association processing unit F5. Furthermore, at the same time, the content generation/distribution control unit F6 performs distribution control for distributing the generated moving image content to the user terminal 5.

Here, in this example, the moving image content obtained by inserting the image based on the user captured image into the captured image generation corresponding section in the PGM image is generated as described above; as an example of this moving image content, it is conceivable to generate by inserting the user captured image itself into the captured image generation corresponding section in the PGM image. Alternatively, as the moving image content, it is also conceivable that a processed image of the user captured image is inserted into the captured image generation corresponding section in the PGM image. Moreover, it is also conceivable that the user captured image is inserted in a picture-in-picture format into the image in the captured image generation corresponding section in the PGM image.

Hereinafter, the moving image content is generated by inserting the user captured image itself into the captured image generation corresponding section in the PGM image.

Specific content generation example and distribution control example by the content generation/distribution control unit F6 will be described with reference to FIG. 7.

Figure 7:
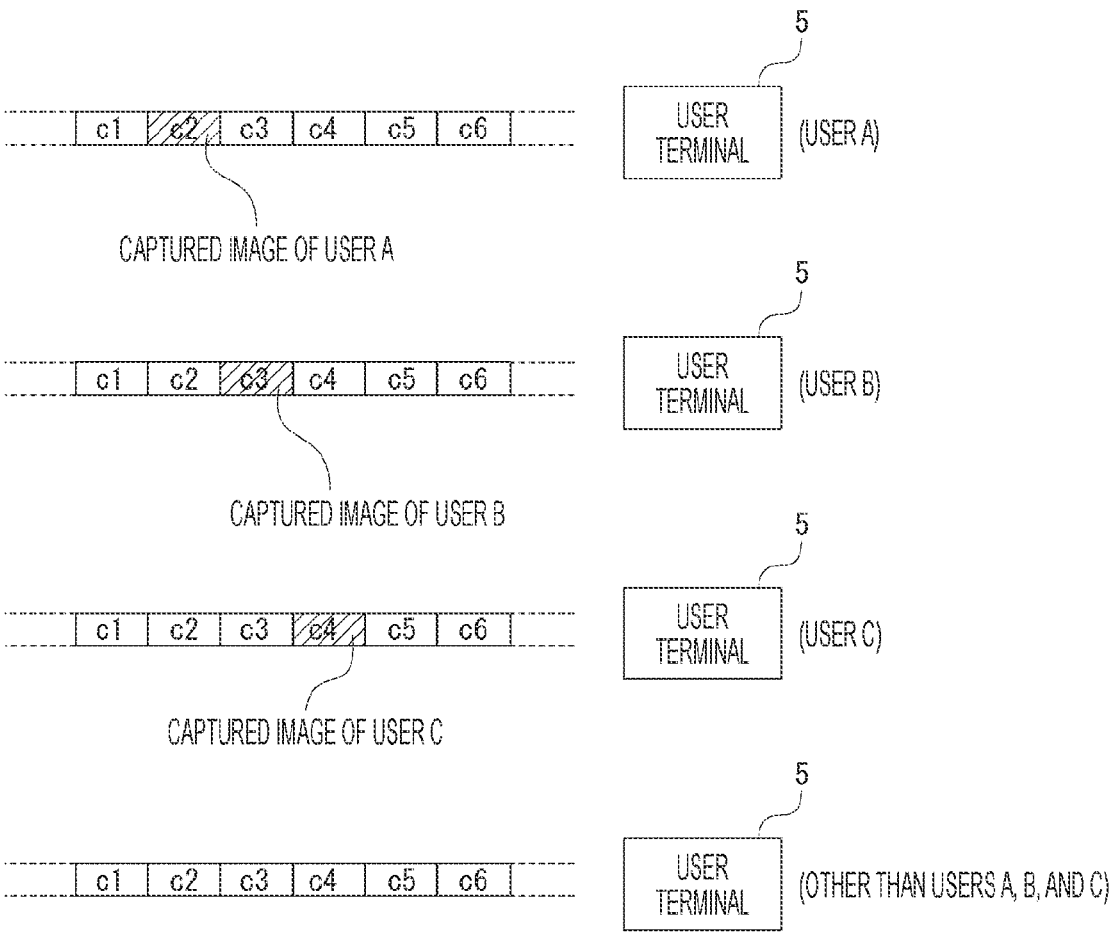
FIG. 7 is an explanatory diagram of a content generation example and a distribution control example in the first embodiment.

In FIG. 7 also, it is assumed that the users whose user images are being displayed in the tiling image are the user A, the user B, and the user C.

In the drawing, sections indicated by a reference sign "c" represent the captured image generation corresponding sections in the PGM image. A captured image generation corresponding section c2 is an image section corresponding to the captured image generation period for the user captured image of the user A, a captured image generation corresponding section c3 is an image section corresponding to the captured image generation period for the user captured image of the user B, and a captured image generation corresponding section c4 is an image section corresponding to the captured image generation period for the user captured image of the user C.

As illustrated in the drawing, in this example, the moving image content to be distributed to the user A is generated by inserting the user captured image of the user A into the captured image generation corresponding section c2, and the moving image content to be distributed to the user B is generated by inserting the user captured image of the user B into the captured image generation corresponding section c3. Furthermore, the moving image content to be distributed to the user C is generated by inserting the user captured image of the user C into the captured image generation corresponding section c4.

In this manner, in this example, generated is a plurality of moving image contents obtained by inserting the image based on the user captured image into the captured image generation corresponding section of each user captured image in the PGM image for each user captured image of each user whose user image is being displayed in the tiling image.

In other words, it may be said that the plurality of moving image contents obtained by inserting the image based on the user captured image into different partial image sections in the PGM image for each user captured image.

Therefore, it becomes possible to insert the user captured image for each user into the PGM image in a time division manner.

Therefore, it is suitable for generating the moving image content for each user for a live event.

Furthermore, as can be seen with reference to FIG. 7, in this example, the moving image content generated by the content generation/distribution control unit F6 is distributed to the user associated with the user captured image inserted into the moving image content.

Therefore, the moving image content obtained by inserting the image based on the user captured image into the PGM image can be appropriately distributed to the user associated with the user captured image, that is, the user appearing in the user captured image in this example.

Furthermore, in this example, the content generation/distribution control unit F6 performs control so that the PGM image into which the user captured image is not inserted is distributed to the user (in the drawing, other than the users A, B, and C) whose user image is not displayed in the tiling image.

In other words, the content generation/distribution control unit F6 performs control so that the PGM image is distributed to other users not associated with the user-related image inserted into the moving image content.

Therefore, the moving image content into which the user captured image of the user as another person (that is, in this case, the users A, B, and C) is inserted is prevented from being distributed to the user whose user captured image is not inserted into the moving image content.

Furthermore, since the PGM image into which the user captured image of another person is not inserted is distributed to the users other than the users A, B, and C, it is possible to prevent a subject that is originally desired to be viewed such as a performer in a music live show from being blocked by the user captured image of another person.

(1-4. Processing Procedure)

Subsequently, a specific processing procedure example for implementing an image processing method as the first embodiment described above will be described with reference to a flowchart in FIG. 8.

Figure 8:
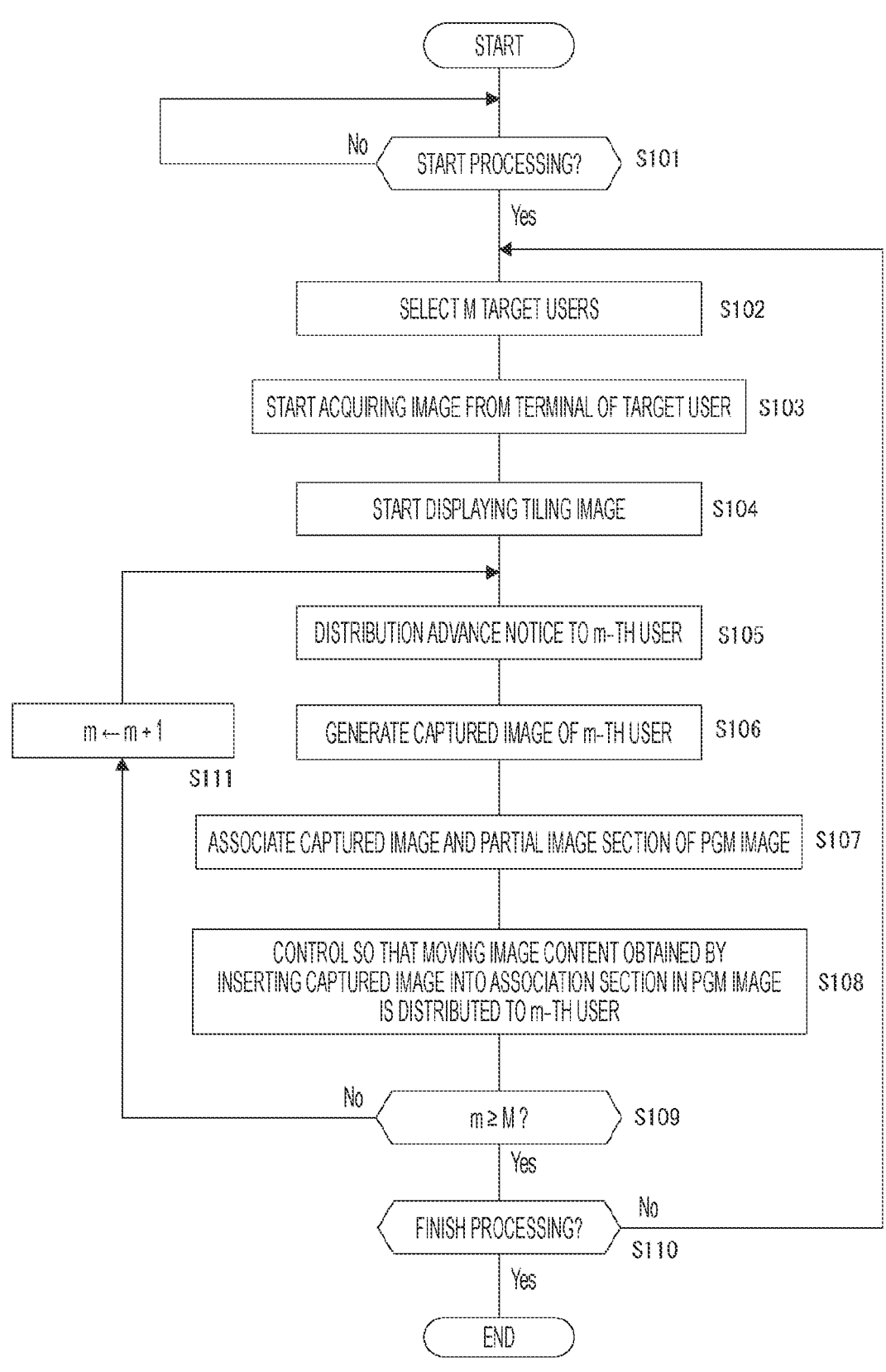
FIG. 8 is a flowchart illustrating a specific processing procedure example for implementing an image processing method as the first embodiment.

The processing illustrated in FIG. 8 is executed by the CPU 71 in the computer device 70 as the information processing device 1.

Note that, when starting the processing illustrated in FIG. 8, it is assumed that determination of the number of tiling images to be generated and the display period of each tiling image, and the allocation of the display target users in each tiling image as described as the function of the target user selection unit F1 described above are completed.

First, the CPU 71 stands by for a processing starting condition to be satisfied at step S101. Specifically, in this example, processing of standing by for arrival of an event start timing is performed.

For example, in a case where the event start timing arrives and it is determined that the processing starting condition is satisfied, the CPU 71 proceeds to step S102 and selects M target users. This is processing of selecting M users allocated to the tiling image to be newly displayed as target users on the basis of allocation information of the display target users in each tiling image by the function of the target user selection unit F1.

Note that, M is the same as the number of region divisions in the tiling image in this example.

Here, although not illustrated, in a case where the M target users are selected at step S102, the CPU 71 resets a target user identifier m to be described later to an initial value (1 in this example).

At step S103 subsequent to step S102, the CPU 71 starts acquiring the image from the terminal of the target user. That is, it is started to acquire the user images (the imaged images of the users in this example) from the user terminals 5 of the M target users.

At step S104 subsequent to step S103, the CPU 71 performs tiling image display start processing. That is, processing for allowing the display device 4 to start displaying the tiling image in which the user images of the M target users acquisition of which is started at step S103 are tiled is performed.

At step S105 subsequent to step S104, the CPU 71 performs distribution advance notice to an m-th user. Here, "m" is an identifier (referred to as a "target user identifier m") for identifying each of the M target users selected at step S102, and an initial value of which is "1".

At step S105, the CPU 71 executes the distribution advance notice of the moving image content to the user terminal 5 of the user specified by the target user identifier m.

At step S106 subsequent to step S105, the CPU 71 performs processing of generating the captured image of the m-th user. That is, for the m-th user, the user captured image based on the imaged image of the camera 2-$n$ is generated.

At step S107 subsequent to step S106, the CPU 71 performs processing of associating the captured image with the partial image section of the PGM image. That is, in this example, the processing of associating the image ID of the user captured image generated at step S106 with the information of the captured image generation corresponding section for the user captured image in the PGM image is performed.

At step S108 subsequent to step S107, the CPU 71 performs control so that the moving image content obtained by inserting the captured image into the association section in the PGM image is distributed to the m-th user. That is, this performs control so that the moving image content obtained by inserting the user captured image generated at step S106 into the captured image generation corresponding section in the PGM image having an association relationship by the processing at step S107 is distributed to the user terminal 5 of the m-th user.

In response to the execution of the processing at step S108, the CPU 71 proceeds to step S109 and determines whether or not the target user identifier m is M or larger.

At step S109, when the target user identifier m is not M or larger, the CPU 71 increments the target user identifier m by 1 at step S111, and returns to step S105.

Therefore, the distribution advance notice and the generation and distribution of the moving image content corresponding to the user are performed for the next user out of the M target users (that is, the display target user whose user image is being displayed in the tiling image in this example).

In contrast, when the target user identifier m is M or larger at step S109, the CPU 71 proceeds to step S110 and determines whether or not a processing end condition is satisfied. Specifically, in this example, it is determined whether or not an event end timing arrives.

At step S110, for example, in a case where the event end timing does not arrive and it is determined that the processing end condition is not satisfied, the CPU 71 returns to step S102.

Therefore, for the new M target users whose user images are to be displayed in the next tiling image, processing for displaying the tiling image (S103 to S104) and processing for generating or distributing the moving image content for each target user (S105 to S109) are performed.

In contrast, in a case where it is determined at step S110 that the processing end condition is satisfied, the CPU 71 finishes a series of processing illustrated in FIG. 8.

(1-5. Variation of First Embodiment)

Here, a variation as follows is conceivable for the first embodiment.

An example of displaying the tiling image and distributing the moving image content into which the user captured image is inserted for all the sections of the event has been described above; however, a prohibited section may be provided for the display of the tiling image and the distribution of the moving image content. For example, it is conceivable to provide the prohibited section and distribute a common image as a PGM image to all virtually participating users in the prohibited section.

Furthermore, it is not essential to display a user image for all the virtually participating users, and it is also conceivable to configure so that the user can refuse transmission of the user image from a user terminal 5 and display on a display device 4.

Moreover, for example, it is conceivable to allow the user of an information processing device 1 to refuse display of the user image from a malicious user.

Furthermore, it is also conceivable to dynamically change a display mode of the tiling image.

For example, it is conceivable that a display mode of the user image in the tiling image is determined on the basis of action management information for managing an action history related to an event of the virtually participating user.

The action management information herein mentioned includes any information for managing the action history related to the event of the user such as, for example, management information related to a purchasing action of a participation ticket for the event by the user, management information related to a tipping action performed by the user on a performer in a case where the event is a music live show and the like, and management information related to a posting action of the user on a social networking service (SNS) site such as an event official site.

For example, a CPU 71 of the information processing device 1 determines the display mode of the user image in the tiling image for the user on the basis of ticket amount information stored in a predetermined memory device such as a storage unit 79, for example, that is, information indicating the amount of the participation ticket purchased by the user. Specifically, it is conceivable to perform control to make the display of the user image in the tiling image conspicuous for the user who purchases an expensive ticket (of a predetermined amount or more, for example).

Alternatively, the CPU 71 of the information processing device 1 may also determine the display mode of the user image in the tiling image for the user on the basis of tip amount information stored in a predetermined memory device such as the storage unit 79, for example, that is, the information indicating the amount of the tip given by the user for the event. Specifically, it is conceivable to perform control to make the display of the user image in the tiling image conspicuous for the user who performs an expensive tipping action (of a predetermined amount or more, for example).

Figure 9:
FIG. 9 is an explanatory diagram of a display example for making display of a user image of a specific user conspicuous in a tiling image.

As a display example for making the display of the user image of the specific user conspicuous in the tiling image, for example, as illustrated in FIG. 9, it is conceivable to enlarge a display region of the user image for the specific user and the like.

Alternatively, although not illustrated in the drawing, it is also conceivable to make a color of a frame of the display region of the user image for the specific user a color different from the color of the frame of other display regions and the like.

Furthermore, it is also conceivable to perform control to make the user image in the tiling image conspicuous for the specific user on the basis of an element other than an element related to the action of the user.

Figure 10:
FIG. 10 is an explanatory diagram of another display example for making display of a user image of a specific user conspicuous in a tiling image.

For example, as illustrated in FIG. 10, it is conceivable to perform control to make the user image of a user whose birthday is today conspicuous.

Furthermore, an example has been described above in which the user captured image is generated for each individual display target user in the tiling image; however, the user captured image can also be generated for every plurality of display target users. For example, in a case where a plurality of users participates in an event as a group, it is conceivable to generate an image including the user images of all the display target users forming the group in an image frame as the user captured image for the group and the like.

Furthermore, in this case, it is conceivable to distribute a moving image content generated in common for the group (a moving image content into which the user captured image for the group is inserted) to each user forming the group.

Furthermore, it is also conceivable to generate the user captured image as an image in which a user who virtually participates (the user image displayed on the display device 4) and a performer appear together.

Note that, since a communication delay might occur between the information processing device 1 and the user terminal 5, in a case where an image obtained by imaging the user is used as the user image, it is also conceivable to adjust an acquisition timing and the like of the user image from the user terminal 5 in consideration of the communication delay.

2. Second Embodiment

Next, a second embodiment will be described.

The second embodiment is an embodiment on the premise that a user actually participates in an event.

Note that, in the following description, the same reference signs are given to parts similar to those already described, and description thereof will be omitted.

In the second embodiment, a target event is a live show with spectators.

Figure 11:
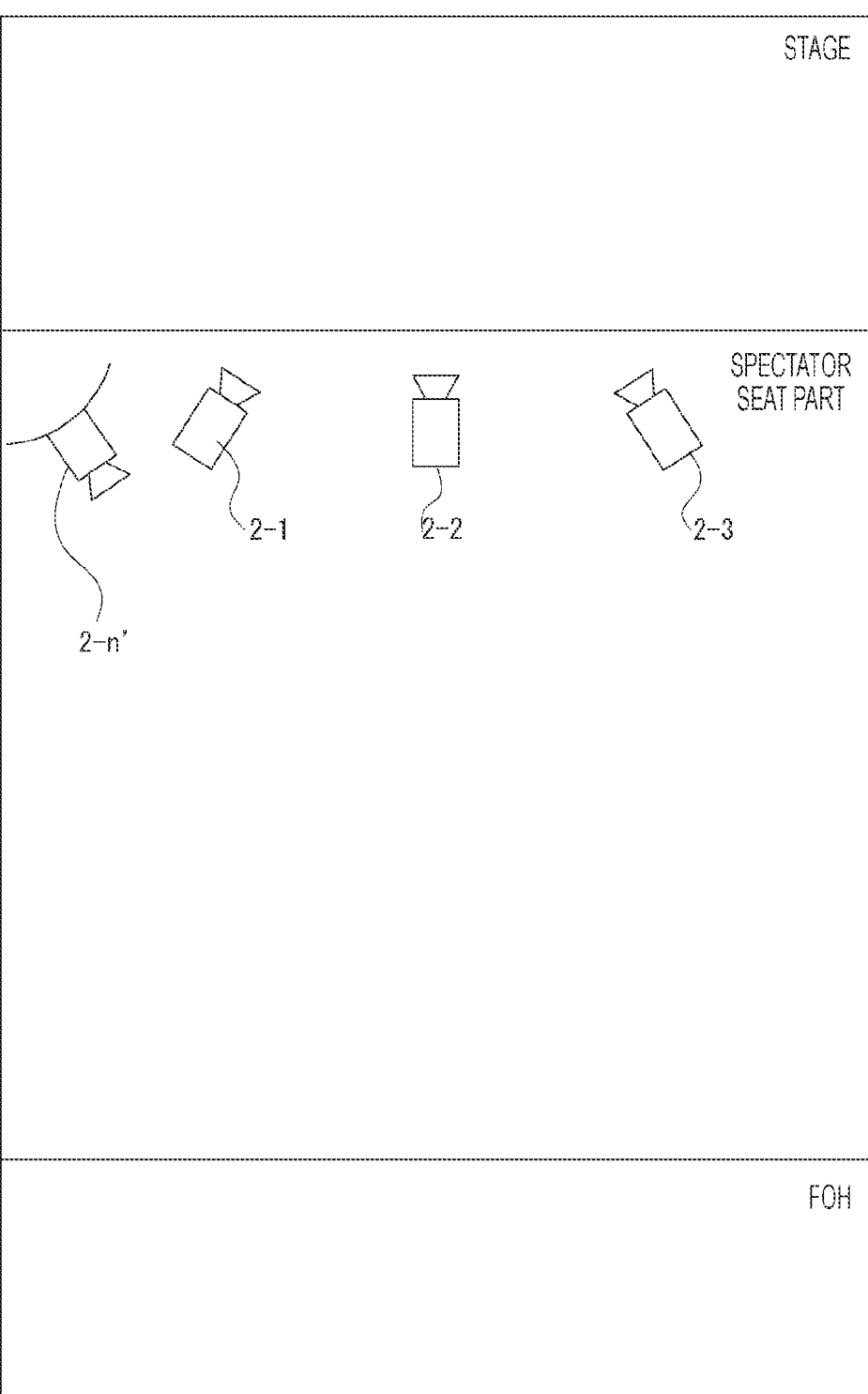
FIG. 11 is an explanatory diagram of an arrangement example of cameras in an image processing system of a second embodiment.

In an image processing system of the second embodiment, as illustrated in FIG. 11, a camera 2-n' capable of imaging a spectator seat part from an anterior side (stage side) is provided as a camera 2.

In the second embodiment, an imaged image by the camera 2-n' is used as a user captured image of an actually participating user.

Figure 12:
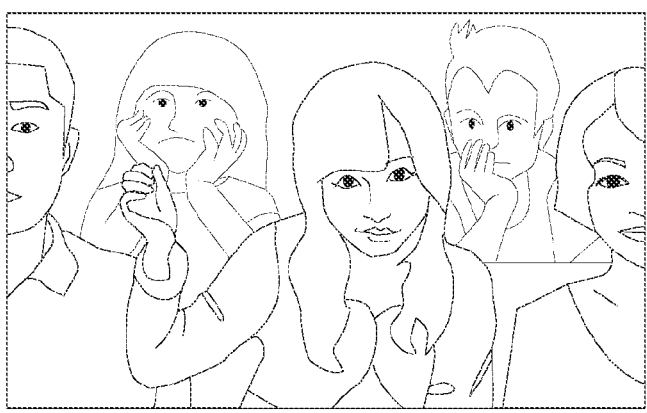
FIG. 12 is a diagram illustrating an example of a user captured image in the second embodiment.

FIG. 12 illustrates an example of the user captured image obtained by imaging a specific event participating user in the spectator seat part by the camera 2-n'.

Figure 13:
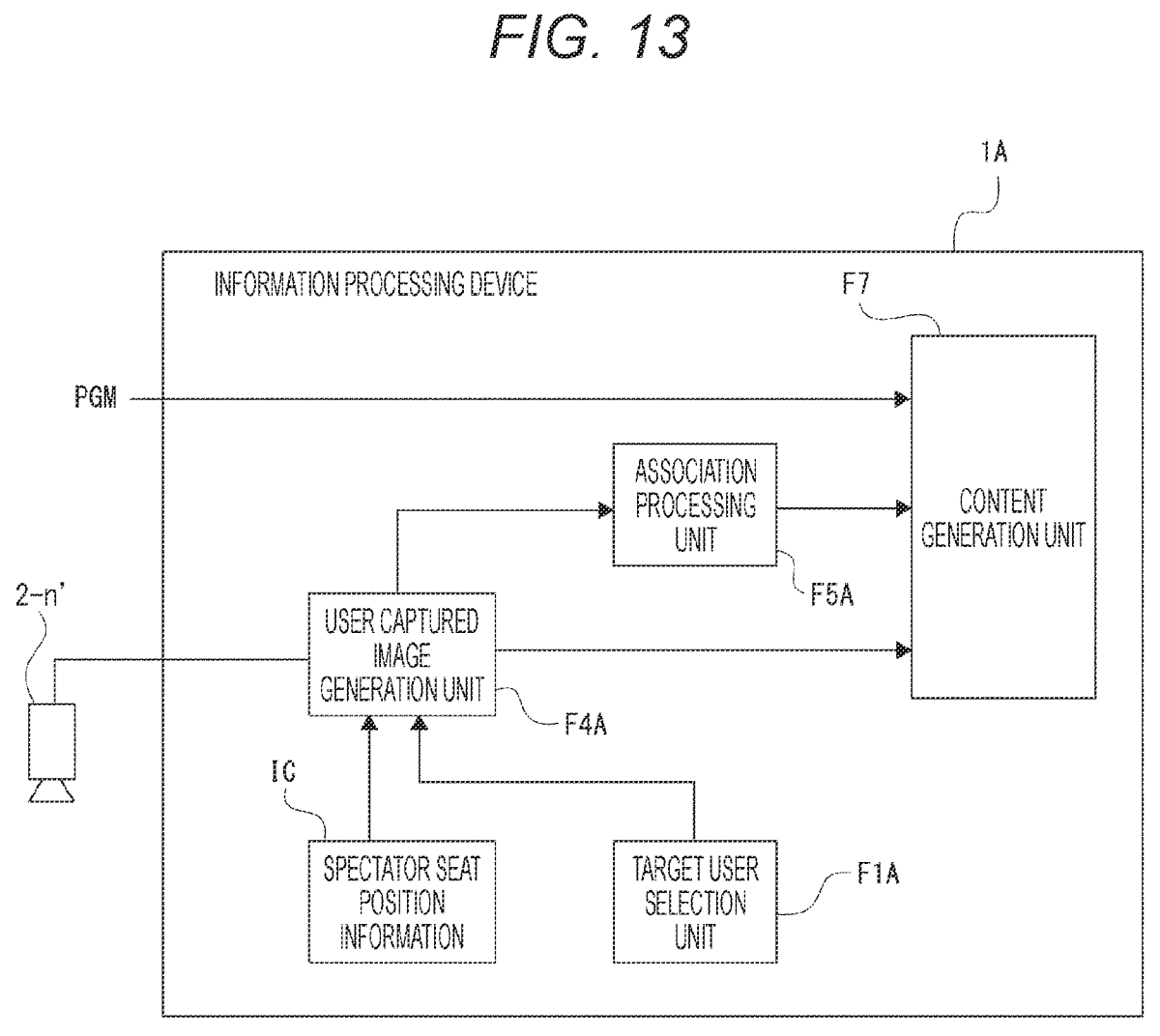

FIG. 13 is an explanatory diagram of functions of an information processing device 1A included in the image processing system as the second embodiment. Note that, FIG. 13 illustrates the camera 2-n' included in the image processing system as the second embodiment together with functional blocks indicating functions as the second embodiment included in the information processing device 1A.

Note that, although not illustrated in the drawing, the image processing system as the second embodiment includes a camera other than the camera 2-n' such as cameras 2-1 to 2-3, and a switcher 3 that selects the imaged image of each camera 2 to output as a PGM image similarly to the image processing system illustrated in FIG. 1, but the camera 2 other than the camera 2-n' and the switcher 3 are not illustrated in FIG. 13.

As illustrated in the drawing, the information processing device 1A has functions as a target user selection unit F1A, a user captured image generation unit F4A, an association processing unit F5A, and a content generation unit F7.

The target user selection unit F1A sequentially selects users who actually participate in the event, and outputs information indicating the selected user to the user captured image generation unit F4A.

In this example, the target user selection unit F1A selects the user so that all the participating users are selected within a period from the start to the end of the event.

The user captured image generation unit F4A generates an image in which the user selected by the target user selection unit F1A is captured in an image frame as the user captured image for the user on the basis of the imaged image by the camera 2-*n*'. In this case, spectator seat position information IC is used to generate the user captured image. The spectator seat position information IC is information obtained by associating each participating user as a ticket purchaser with information indicating the spectator seat position of the user.

The user captured image generation unit F4A acquires information of the spectator seat position of the selected user on the basis of the information indicating the selected user input from the target user selection unit F1A and the spectator seat position information IC, and performs composition control of the camera 2-*n*' on the basis of the acquired information of the spectator seat position to generate the user captured image as the image in which the selected user is captured in the image frame.

Note that, the generation of the user captured image here may involve cutout processing on the imaged image of the camera 2-*n*'.

Here, the user captured image generation unit F4A generates the user captured image for each user sequentially selected by the target user selection unit F1A from the start to the end of the event, and the user captured image generation unit F4A outputs information indicating a period in which each image is generated to the association processing unit F5A as information of a captured image generation period for each user captured image sequentially generated in this manner.

Furthermore, the user captured image generation unit F4A outputs an image ID of the generated user captured image to the association processing unit F5A together with the information of the captured image generation period described above.

The association processing unit F5A associates a partial image section being a partial section of an imaged moving image content (PGM image) with a user-related image being an image related to the user (the user captured image in this example).

Specifically, the association processing unit F5A specifies, from the information of the captured image generation period for each user captured image input from the user captured image generation unit F4A, an image section corresponding to each captured image generation period in the PGM image. The image section specified in this manner is also referred to as a "captured image generation corresponding section" in this case also.

The association processing unit F5A performs processing of associating the image ID of each user captured image input from the user captured image generation unit F4A with information of the captured image generation corresponding section for each user captured image specified as described above.

The content generation unit F7 generates the moving image content obtained by inserting the image based on the user captured image into the captured image generation corresponding section in the PGM image on the basis of the association information between the captured image generation corresponding section and the user captured image by the association processing unit F5A.

In this example, the content generation unit F7 generates, for each user selected by the target user selection unit F1A, the moving image content in which the user captured image is inserted into the captured image generation corresponding section for the user.

Figure 14:
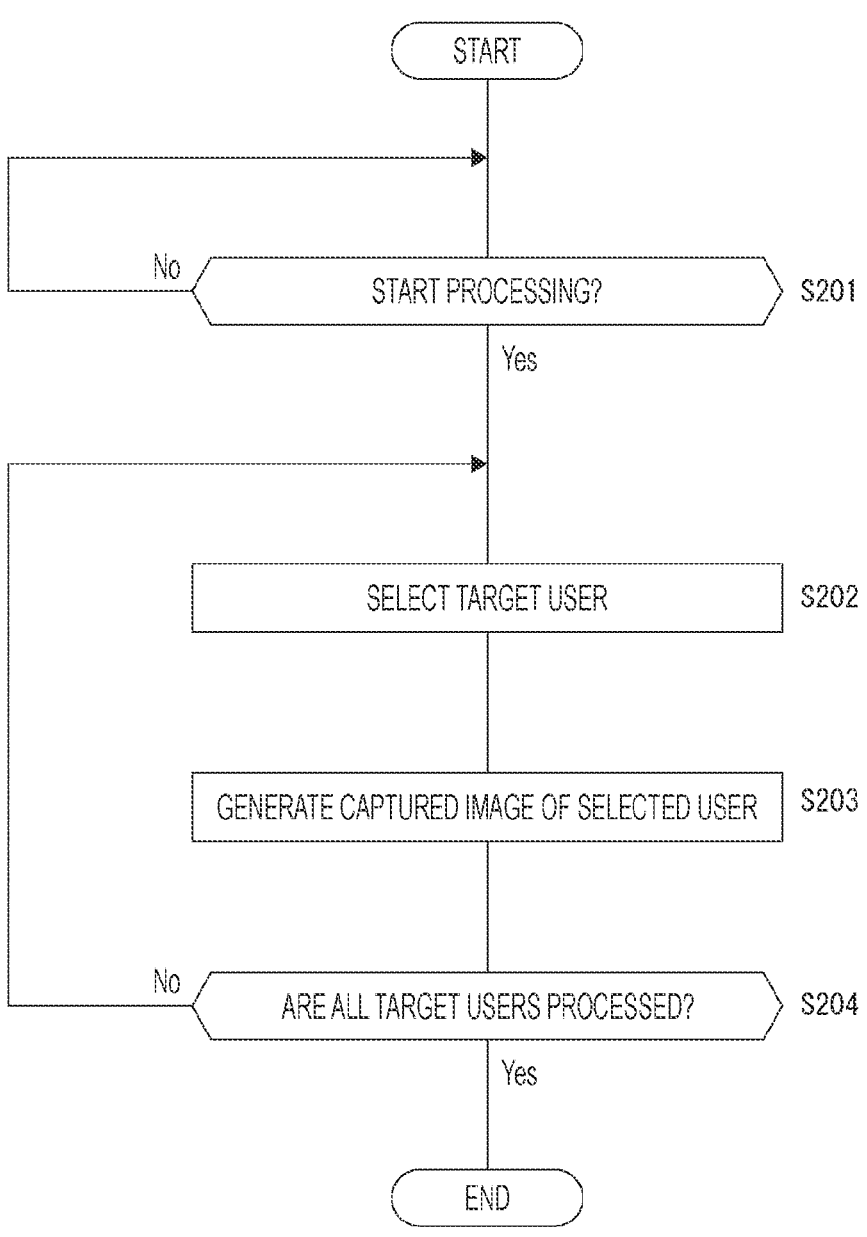
FIG. 14 is a flowchart of processing of generating the user captured image in the second embodiment.

FIG. 14 is a flowchart of processing of generating the user captured image in the second embodiment.

Note that, the processing illustrated in FIG. 14 is executed by the CPU 71 in the computer device 70 as the information processing device 1A.

First, the CPU 71 stands by for a processing starting condition (for example, arrival of an event start timing) to be satisfied at step S201, and performs processing of selecting the target user at step S202 according to the satisfaction of the processing starting condition. This corresponds to the processing of the target user selection unit F1A described above.

At step S203 subsequent to step S202, the CPU 71 generates the captured image of the selected user. That is, the user captured image for the user selected at step S202 is generated by the processing as the user captured image generation unit F4A described above.

At step S204 subsequent to step S203, the CPU 71 determines whether or not all the target users are processed, that is, determines whether or not the user captured images are generated for all the users as the actual event participants in this example.

In a case where not all the target users are processed, the CPU 71 returns to step S202. Therefore, the processing is repeated until the user captured images are generated for all the target users.

In contrast, in a case where it is determined that all the target users are processed, the CPU 71 finishes a series of processing illustrated in FIG. 14.

Figure 15:
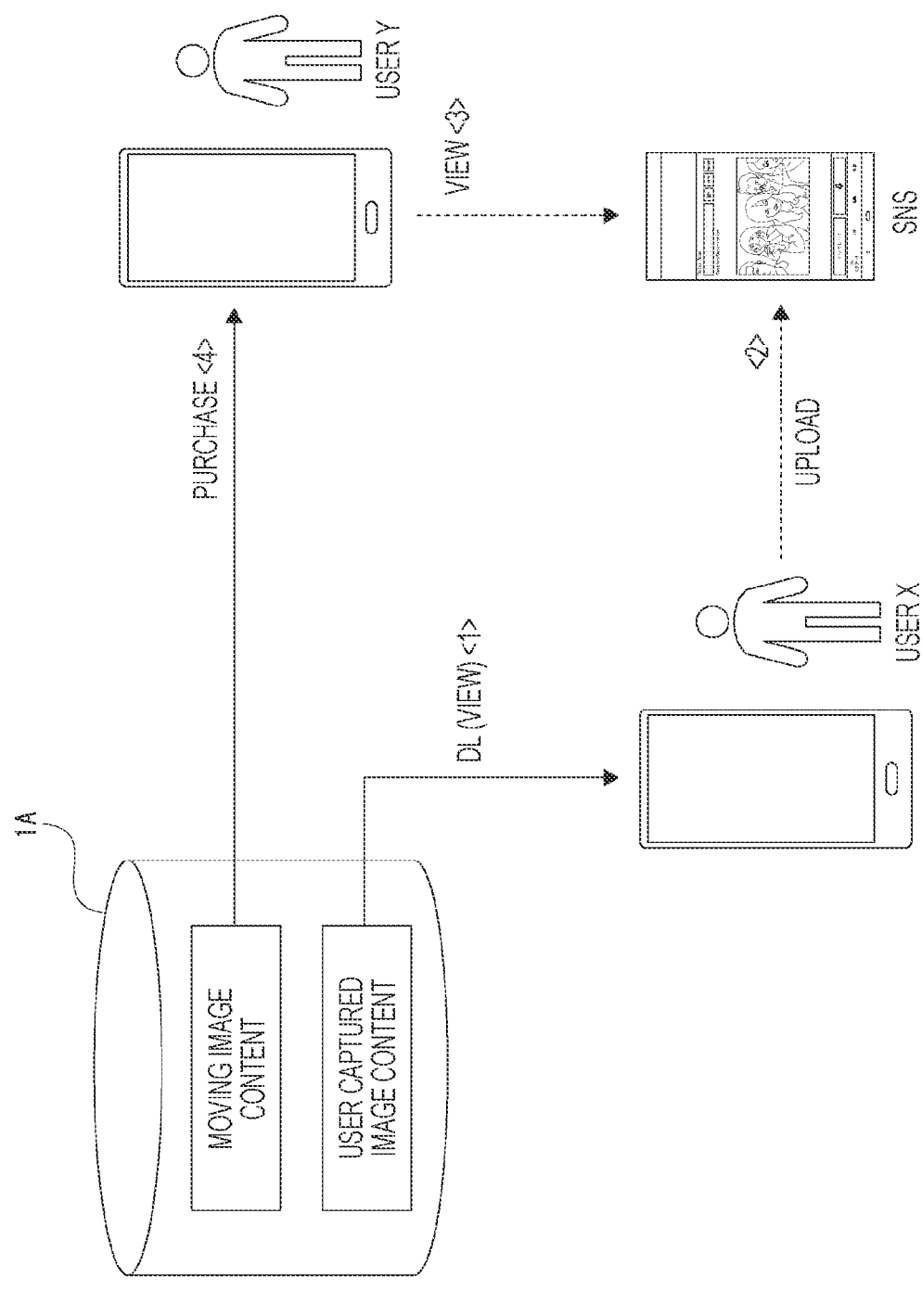
FIG. 15 is an explanatory diagram of an example of a business model using an image processing system of the second embodiment.

Here, in the second embodiment, in the information processing device 1A, the moving image content into which the user captured image is inserted and the content of the user captured image (the captured image content of the user) are obtained for the actual participant of each event, and it is conceivable to construct a business model as illustrated in FIG. 15, for example, using these contents.

First, as indicated by <1> in the drawing, a user X who actually participates in the event downloads the captured image content in which the user X appears from the information processing device 1A, for example. At that time, the download can be free or charged.

It is conceivable that the user X who downloads the captured image content of the user X posts the captured image content to, for example, an SNS site as indicated by <2> in the drawing.

The captured image content of the user X posted on the SNS site in this manner may be viewed by a user Y who is an acquaintance and the like of the user X (<3> in the drawing).

At that time, the user Y is interested in the event in which the user X has participated by viewing the captured image content of the user X, and a possibility of purchasing the moving image content generated for the event increases (<4> in the drawing).

According to the second embodiment, for example, such business model can be constructed.

Note that, in the second embodiment, an example is described in which the user captured image is generated for each user; however, as in the case of the first embodiment, in a case where a plurality of users participates in an event as a group and the like, the user captured image can be generated for every plurality of users.

Furthermore, in the second embodiment, it is also conceivable to provide a prohibited section for generation of the user captured image.

3. Variation

Here, embodiments are not limited to the specific examples described so far, and configurations as various variations can be adopted.

For example, in the above description, an example is described in which the information processing device (the information processing device 1 or 1A) as the embodiment is arranged in the event venue, but the information processing device as the embodiment may be arranged in a place different from the event venue as, for example, a cloud server and the like.

In this case, the PGM image by the switcher 3 installed in the event venue or the imaged image by the cameras 2-*n* and 2-*n'* (the imaged image used to generate the user captured image) is transmitted to the information processing device via the network.

Furthermore, it is not essential for the switcher 3 to be installed in the event venue, and in a case where the switcher 3 implemented by a software program by an information processing device in place of a hardware device is used as the switcher 3, it is also conceivable to adopt a configuration in which the function as the switcher 3 is implemented on a cloud server.

Furthermore, in the above description, an example is described in which a plurality of user images is displayed as the tiling image on the display device 4; however, the arrangement of the plurality of user images on the display device 4 is not limited to tiled arrangement, and it is sufficient that at least a plurality of user images is arranged side by side.

Furthermore, in the above description, an example is described in which the tiling image is updated in conjunction with change in target user of the target user selection unit F1 of the information processing device 1. That is, this is an example in which the information processing device 1 determines an update timing of the tiling image. However, it is also possible to update the tiling image on the basis of input information from the user terminal 5 side.

Furthermore, in the above description, a case where the event to be imaged is a music live event is exemplified, but the present technology can also be suitably applied to a case where another event is to be imaged such as a program recording in a studio and a sports event such as baseball, football, basketball, volleyball and the like, for example, as well as an event in which a program is performed on a stage (whether inside or outside a house) such as a musical, for example.

4. Program

The information processing device (1 or 1A) as the embodiment is described above; a program of the embodiment is a program that allows a computer device such as a CPU to execute processing as the information processing device 1 or the information processing device 1A.

The program according to the embodiment is a program readable by the computer device and allows the computer device to implement a function of associating a partial image section being a partial section of an imaged moving image content obtained by imaging an event with a user-related image being an image related to a user.

That is, this program corresponds to, for example, a program for allowing the computer device to execute the processing described in FIG. 8 and the like.

Such program may be stored in advance in a recording medium readable by the computer device such as a ROM, a hard disk drive (HDD), and a solid state drive (SSD), for example. Alternatively, the program can be temporarily or permanently stored in a removable recording medium such as a semiconductor memory, a memory card, an optical disk, a magneto-optical disk, and a magnetic disk. Furthermore, such removable recording medium can also be provided as so-called package software.

Furthermore, such program can be installed from the removable recording medium into a personal computer and the like, or can be downloaded from a download site via a network such as a LAN or the Interne to a required information processing device such as a smartphone.

5. Summary of Embodiments

As described above, the information processing device (1 or 1A) as the embodiment includes the association processing unit (F4, F4A) that associates the partial image section being the partial section of the imaged moving image content obtained by imaging the event with the user-related image being the image related to the user.

The event herein mainly is an event in which user participation is generally assumed such as a music live event, for example. The user participation herein mentioned is a concept including not only actual participation in an event with spectators but also virtual participation (for example, a user image is displayed in an event venue as if the user is participating) in an event without spectators and the like, for example. Furthermore, it is conceivable that the user-related image herein is an image obtained by imaging a user who actually participates in the event, an image obtained by imaging a display image in the event venue of a user who virtually participates and the like.

By associating the partial image section of the imaged moving image content with the user-related image as described above, it becomes possible to provide, as the distribution image content for the user, the content obtained by inserting the user-related image being the image obtained by imaging the user who actually participates or virtually participates as described above and the like into the partial image section being the imaging section of the user in the imaged moving image content of the event and the like.

Therefore, it is possible to improve a solid sense of participation of the user in the event.

Furthermore, the information processing device as the embodiment includes the content generation unit (content generation/distribution control unit F6, content generation unit F7) that generates the moving image content obtained by inserting an image based on the user-related image into the partial image section in the imaged moving image content on the basis of the association information between the partial image section and the user-related image by the association processing unit.

Here, examples of the image based on the user-related image include the user-related image itself, an image obtained by processing the user-related image, or an image including the user-related image as an image obtained by inserting the user-related image into a predetermined image in a picture-in-picture format and the like, for example.

According to the above-described configuration, it becomes possible to provide, as a distribution image content for the user, the content obtained by inserting the image based on the user-related image being the image obtained by imaging the user who actually participates or virtually participates and the like into the partial image section being the imaging section of the user in the imaged moving image content of the event.

Therefore, it is possible to improve a solid sense of participation of the user in the event.

Moreover, the information processing device as the embodiment includes a distribution control unit (content generation/distribution control unit F6) that performs control so that the moving image content generated by the content generation unit is distributed to the user associated with the user-related image (refer to FIG. 7).

Therefore, the moving image content obtained by inserting the image based on the user-related image into the partial image section in the imaged moving image content can be appropriately distributed to the user associated with the user-related image (for example, the user appearing in the user-related image).

Moreover, furthermore, in the information processing device as the embodiment, the distribution control unit performs control so that the imaged moving image content is distributed to another user who is not associated with the user-related image (refer to FIG. 7).

Therefore, the moving image content obtained by inserting the user-related image of the user as another person is prevented from being distributed to the user whose image based on the user-related image is not inserted into the partial image section.

At that time, since the imaged moving image content in which the user-related image of another person is not inserted is distributed to another user, it is possible to prevent a subject that is originally desired to be viewed such as a performer in a music live show, for example, from being blocked by the user-related image of another person.

Furthermore, in the information processing device as the embodiment, there is a plurality of user-related images being images related to different users, respectively, and the content generation unit generates a plurality of moving image contents obtained by inserting the image based on the user-related image into different partial image sections in the imaged moving image content for each user-related image (refer to FIGS. 7 and 8).

Therefore, it becomes possible to insert the user-related image for each user into the imaged moving image content in a time division manner.

Therefore, it is suitable for generating the moving image content for each user for a live event.

Moreover, in the information processing device as the embodiment, the user-related image is an image based on a user image as an image indicating a user.

Here, the image indicating the user is a concept including an image that indicates the user so as to be identified such as an avatar image of the user, for example, in addition to the image obtained by imaging the user.

Since the user-related image is the image based on the user image as the image indicating the user as described above, it is possible to further enhance a solid sense of participation of the user in the event.

Moreover, furthermore, in the information processing device as the embodiment, the user-related image is an image obtained by imaging the user image displayed in a venue of the event.

Therefore, it is possible to improve the solid sense of participation of the user in the event corresponding to a case where the user virtually participates in the event.

Furthermore, in the information processing device as the embodiment, the user images of a plurality of users are displayed in the venue of the event, and the user-related image is an image that captures a user image of a target user out of the user images displayed in the venue of the event.

Therefore, the user who receives the distribution of the moving image content can be made to recognize that the user's own user image is displayed in the event venue.

Therefore, it is possible to improve a solid sense of participation of the user in the event.

Moreover, in the information processing device as the embodiment, the user image is an image obtained by imaging the user.

Therefore, the user-related image can be the image obtained by imaging the user, and the solid sense of participation of the user in the event can be improved.

Moreover, in the information processing device as the embodiment, the user-related image is an image based on a user imaged image as an imaged image of a user.

The user imaged image mentioned here is a concept including not only an image obtained by imaging the user who actually participates in the event with spectators but also an image obtained by imaging the user who virtually participates in the event without spectators and the like (image obtained by imaging the user image displayed in the event venue).

Therefore, the user-related image can be the image obtained by imaging the user, and the solid sense of participation of the user in the event can be improved.

Furthermore, in the information processing device as the embodiment, the user-related image is an image cut out to be an image in which a predetermined number of users appear from the user imaged image.

Therefore, the user who receives the distribution of the moving image content can be made to recognize that the user actually participates or virtually participates the event.

Therefore, it is possible to improve a solid sense of participation of the user in the event.

Moreover, in the information processing device as the embodiment, a predetermined number is one.

Therefore, it is possible to improve the solid sense of participation of the user in the event corresponding to a case where the user participates as an individual in the event.

Moreover, in the information processing device as the embodiment, a predetermined number is two or larger.

Therefore, it is possible to improve the solid sense of participation of the user in the event corresponding to a case where a plurality of users participates in the event as a group.

Furthermore, in the information processing device as the embodiment, the user-related image is an image obtained by imaging a user image as an image indicating a user displayed in a venue of the event, and an arranged image generation unit (tiling image generation unit F3) that generates an arranged image in which the user images of a plurality of users are arranged side by side as an image displayed in a venue of the event is included.

Therefore, the users who virtually participate can be efficiently displayed as compared with a case where the user image of each user is displayed in a time division manner.

Moreover, in the information processing device as the embodiment, the arranged image generation unit determines a display mode of the user image in the arranged image on the basis of action management information for managing an action history regarding the event of the user.

According to the above-described configuration, the display mode of the user image in the arranged image can be appropriately determined according to a degree of contribution of the user to the event and the like.

Moreover, in the information processing device as the embodiment, the action management information includes ticket amount information indicating an amount of a participation ticket for the event purchased by the user, and the arranged image generation unit determines a display mode of the user image in the arranged image on the basis of the ticket amount information.

Therefore, for example, the display mode of the user image in the arranged image can be appropriately determined according to the amount of the participation ticket purchased by the user, such as displaying the user image of the user who purchases an expensive ticket in a large size.

Furthermore, in the information processing device as the embodiment, the action management information includes tip amount information indicating an amount of a tip given by the user for the event, and the arranged image generation unit determines a display mode of the user image in the arranged image on the basis of the tip amount information.

Therefore, for example, the display mode of the user image in the arranged image can be appropriately determined according to the amount of the tip by the user, such as displaying the user image of the user who gives an expensive tip in a large size.

Furthermore, an information processing method as the embodiment is an information processing method of associating a partial image section being a partial section of an imaged moving image content obtained by imaging an event with a user-related image being an image related to a user performed by the information processing device.

With such information processing method also, functions and effects similar to those of the information processing device as the embodiment described above can be obtained.

Note that, the effects described in the present specification are merely examples and are not limited, and other effects may be provided.

6. Present Technology

Note that, the present technology can also have the following configurations.

(1)

An information processing device including an association processing unit that associates a partial image section being a partial section of an imaged moving image content obtained by imaging an event with a user-related image being an image related to a user.

(2)

The information processing device according to (1) described above, further including a content generation unit that generates a moving image content obtained by inserting an image based on the user-related image into the partial image section in the imaged moving image content on the basis of association information between the partial image section and the user-related image by the association processing unit.

(3)

The information processing device according (2) described above, further including a distribution control unit that performs control so that the moving image content generated by the content generation unit is distributed to the user associated with the user-related image.

(4)

The information processing device according to (3) described above, in which the distribution control unit performs control so that the imaged moving image content is distributed to another user who is not associated with the user-related image.

(5)

The information processing device according to any one of (2) to (4) described above, in which there is a plurality of the user-related images being images related to different users, respectively, and the content generation unit generates a plurality of moving image contents obtained by inserting an image based on the user-related image into different partial image sections in the imaged moving image content for each user-related image.

(6)

The information processing device according to any one of (1) to (5), in which the user-related image is an image based on a user image as an image indicating a user.

(7)

The information processing device according to (6) described above, in which the user-related image is an image obtained by imaging the user image displayed in a venue of the event.

(8)

The information processing device according to (7), in which user images of a plurality of users are displayed in the venue of the event, and the user-related image is an image that captures a user image of a target user out of the user images displayed in the venue of the event.

(9)

The information processing device according to any one of (6) to (8), in which the user image is an image obtained by imaging a user.

(10)

The information processing device according to any one of (1) to (5), in which the user-related image is an image based on a user imaged image as an imaged image of the user.

(11)

The information processing device according to (10), in which the user-related image is an image cut out to be an image in which a predetermined number of users appear from the user imaged image.

(12)

The information processing device according to (11), in which the predetermined number is one.

(13)

The information processing device according to (11), in which the predetermined number is two or larger.

(14)

The information processing device according to any one of (1) to (9), in which the user-related image is an image obtained by imaging a user image as an image indicating a user displayed in a venue of the event, the information processing device including an arranged image generation unit that generates an arranged image in which user images of a plurality of users are arranged side by side as an image displayed in the venue of the event.

(15)

The information processing device according to (14) described above, in which the arranged image generation unit determines a display mode of the user image in the arranged image on the basis of action management information for managing an action history regarding the event of the user.

(16)

The information processing device according to (15) described above, in which the action management information includes ticket amount information indicating an amount of a participation ticket for the event purchased by the user, and the arranged image generation unit determines a display mode of the user image in the arranged image on the basis of the ticket amount information.

(17)

The information processing device according to (15) or (16) described above, in which the action management information includes tip amount information indicating an amount of a tip given by the user for the event, and the arranged image generation unit determines a display mode of the user image in the arranged image on the basis of the tip amount information.

(18)

An information processing method including associating a partial image section being a partial section of an imaged moving image content obtained by imaging an event with a user-related image being an image related to a user, performed by an information processing device.

(19)

A program readable by a computer device, the program allowing the computer device to implement a function of associating a partial image section being a partial section of an imaged moving image content obtained by imaging an event with a user-related image being an image related to a user.

REFERENCE SIGNS LIST 1, 1A Information processing device
2, 2-1, 2-2, 2-3, 2-*n*, 2-*n*' Camera
3 Switcher
4 Display device
5 User terminal
NT Network
70 Computer device
71 CPU
72 ROM
73 RAM
74 Nonvolatile memory unit
75 Input/output interface
76 Input unit
77 Display unit 78 Audio output unit
79 Storage unit
80 Communication unit
81 Drive
82 Removable recording medium
83 Bus
F1, F1A Target user selection unit
F2 User image acquisition unit
F3 Tiling image generation unit
F4, F4A User captured image generation unit
F5, F5A Association processing unit
F6 Content generation/distribution control unit
F7 Content generation unit
IC Spectator seat position information

The invention claimed is:

1. An information processing device comprising:
circuitry configured to:
associate a specific partial image section being a partial section of an imaged moving image content obtained by imaging an event with a user-related image being an image related to a specific user; and
generate a moving image content obtained by inserting an image based on the user-related image into the specific partial image section in the imaged moving image content on a basis of the association between the specific partial image section and the user-related image,
wherein the specific partial image section is a region of the imaged moving image content having an area less than an entirety of the region of the imaged moving image content.

2. The information processing device according to claim 1, wherein
the circuitry is further configured to perform control so that the moving image content is distributed to the specific user associated with the user-related image.

3. The information processing device according to claim 2, wherein
the circuitry is further configured to perform control so that the imaged moving image content is distributed to another user who is not associated with the user-related image.

4. The information processing device according to claim 1, wherein
there is a plurality of the user-related images being images related to different users, respectively, and
the circuitry is further configured to generate a plurality of moving image contents obtained by inserting an image based on the user-related image into different partial image sections in the imaged moving image content for each user-related image.

5. The information processing device according to claim 1, wherein
the user-related image is an image based on a user image as an image indicating a user.

6. The information processing device according to claim 5, wherein
the user-related image is an image obtained by imaging the user image displayed in a venue of the event.

7. The information processing device according to claim 6, wherein
user images of a plurality of users are displayed in the venue of the event, and the user-related image is an image that captures a user image of a target user out of the user images displayed in the venue of the event.

8. The information processing device according to claim 5, wherein the user image is an image obtained by imaging a user.

9. The information processing device according to claim 1, wherein the user-related image is an image based on a user imaged image as an imaged image of the specific user.

10. The information processing device according to claim 9, wherein the user-related image is an image cut out to be an image in which a predetermined number of users appear from the user imaged image.

11. The information processing device according to claim 10, wherein the predetermined number is one.

12. The information processing device according to claim 10, wherein the predetermined number is two or larger.

13. The information processing device according to claim 1, wherein the user-related image is an image obtained by imaging a user image as an image indicating a user displayed in a venue of the event, and the circuitry is further configured to generate an arranged image in which user images of a plurality of users are arranged side by side as an image displayed in the venue of the event.

14. The information processing device according to claim 13, wherein the circuitry is further configured to determine a display mode of the user image in the arranged image on a basis of action management information for managing an action history regarding the event of the specific user.

15. The information processing device according to claim 14, wherein the action management information includes ticket amount information indicating an amount of a participation ticket for the event purchased by the user, and the circuitry is further configured to determine a display mode of the user image in the arranged image on a basis of the ticket amount information.

16. The information processing device according to claim 14, wherein the action management information includes tip amount information indicating an amount of a tip given by the user for the event, and the circuitry is further configured to determine a display mode of the user image in the arranged image on a basis of the tip amount information.

17. An information processing method performed by an information processing device, the method comprising:

associating a specific partial image section being a partial section of an imaged moving image content obtained by imaging an event with a user-related image being an image related to a specific user; and generating a moving image content obtained by inserting an image based on the user-related image into the specific partial image section in the imaged moving image content on a basis of the association between the specific partial image section and the user-related image, wherein the specific partial image section is a region of the imaged moving image content having an area less than an entirety of the region of the imaged moving image content.

18. A non-transitory computer-readable medium having embodied thereon a program, which when executed by a computer causes the computer to execute an information processing method, the method comprising:

associating a specific partial image section being a partial section of an imaged moving image content obtained by imaging an event with a user-related image being an image related to a specific user; and generating a moving image content obtained by inserting an image based on the user-related image into the specific partial image section in the imaged moving image content on a basis of the association between the specific partial image section and the user-related image, wherein the specific partial image section is a region of the imaged moving image content having an area less than an entirety of the region of the imaged moving image content.

19. The information processing device according to claim 1, wherein the circuitry is further configured to:

associate another specific partial image section being a partial section of the imaged moving image content with another user-related image being an image related to another specific user; and generate the moving image content obtained by inserting another image based on the another user-related image into the another specific partial image section in the imaged moving image content on a basis of the association between the another specific partial image section and the another user-related image, wherein the another specific partial image section is a region of the imaged moving image content having an area less than the entirety of the region of the imaged moving image content, and wherein the another specific partial image section is different than the specific partial image section and the another specific user is different than the specific user.

* * * * *